(12) United States Patent
Almy

(10) Patent No.: US 7,155,870 B2
(45) Date of Patent: Jan. 2, 2007

(54) SHINGLE ASSEMBLY WITH SUPPORT BRACKET

(75) Inventor: Charles Almy, Berkeley, CA (US)

(73) Assignee: Powerlight Corp., Berkeley, CA (US)

( * ) Notice: Subject to any disclaimer, the term of this patent is extended or adjusted under 35 U.S.C. 154(b) by 126 days.

(21) Appl. No.: 10/872,126

(22) Filed: Jun. 18, 2004

(65) Prior Publication Data

US 2006/0000178 A1    Jan. 5, 2006

(51) Int. Cl.
   *E04D 1/34*    (2006.01)
(52) U.S. Cl. .................. 52/544; 52/173.3; 52/546; 52/551; 248/222.12; 248/225.11
(58) Field of Classification Search ............... 52/173.1, 52/173.3, 291, 518, 544, 546, 547, 551, 24–27; 248/222.11, 222.12, 237, 201, 225.21, 225.11; 136/244, 291, 230, 251
   See application file for complete search history.

(56) References Cited

U.S. PATENT DOCUMENTS

| | | | |
|---|---|---|---|
| 3,769,091 | A | 10/1973 | Leinkram et al. |
| 4,040,867 | A | 8/1977 | Forestieri et al. |
| 4,321,416 | A | 3/1982 | Tennant |
| 4,607,566 | A | 8/1986 | Bottomore et al. |
| 4,677,248 | A | 6/1987 | Lacey |
| 4,936,063 | A | 6/1990 | Humphrey |
| 5,056,288 | A | 10/1991 | Funaki |
| 5,316,592 | A | 5/1994 | Dinwoodie |
| 5,505,788 | A | 4/1996 | Dinwoodie |
| 5,573,600 | A | 11/1996 | Hoang |
| 5,740,996 | A * | 4/1998 | Genschorek ................. 248/237 |
| 5,746,839 | A | 5/1998 | Dinwoodie |
| 5,990,414 | A | 11/1999 | Posansky |
| 6,061,978 | A | 5/2000 | Dinwoodie et al. |
| 6,119,415 | A | 9/2000 | Rinklake et al. |
| 6,148,570 | A | 11/2000 | Dinwoodie et al. |
| 6,341,454 | B1 * | 1/2002 | Koleoglou .................. 52/173.3 |
| 6,360,497 | B1 | 3/2002 | Nakzima et al. |
| 6,463,708 | B1 | 10/2002 | Anderson |
| 6,465,724 | B1 * | 10/2002 | Garvison et al. ........... 136/244 |
| 6,521,821 | B1 * | 2/2003 | Makita et al. .............. 136/244 |

(Continued)

FOREIGN PATENT DOCUMENTS

JP    5917168    3/1984

(Continued)

OTHER PUBLICATIONS

Schott SunRoof™ FS Marketing Materials, 2 pages, in existence as of at least Jan. 2003.

(Continued)

*Primary Examiner*—Jeanette E. Chapman
*Assistant Examiner*—Yvonne M Horton
(74) *Attorney, Agent, or Firm*—James F. Hann; Haynes Beffel & Wolfeld LLP

(57) ABSTRACT

A shingle system, mountable to a support surface, includes overlapping shingle assemblies. Each shingle assembly comprises a support bracket, having upper and lower ends, secured to a shingle body. The upper end has an upper support portion, extending away from the shingle body, and an upper support-surface-engaging part, engageable with a support surface so that the upper edge of the shingle body is positionable at a first distance from the support surface to create a first gap therebetween. The lower end has a lower support portion extending away from the lower surface. The support brackets create: (1) a second gap between shingle bodies of the first and second shingle assemblies, and (2) an open region beneath the first shingle assembly fluidly coupling the first and second gaps.

21 Claims, 9 Drawing Sheets

U.S. PATENT DOCUMENTS

| | | |
|---|---|---|
| 6,584,737 B1 | 7/2003 | Bradley, Jr. |
| 6,606,830 B1 | 8/2003 | Nagao et al. |
| 6,670,541 B1 * | 12/2003 | Nagao et al. ............... 136/251 |
| 6,786,012 B1 * | 9/2004 | Bradley, Jr. ................ 52/173.3 |
| 6,809,251 B1 | 10/2004 | Dinwoodie |
| 6,875,914 B1 * | 4/2005 | Guha et al. ................. 136/251 |
| 6,883,290 B1 | 4/2005 | Dinwoodie |
| 6,959,520 B1 * | 11/2005 | Hartman .................... 52/729.2 |
| 2001/0050101 A1 | 12/2001 | Makita et al. |
| 2003/0154680 A1 | 8/2003 | Dinwoodie |
| 2003/0213201 A1 | 11/2003 | Szacsvay |
| 2003/0217768 A1 | 11/2003 | Guha |
| 2004/0031219 A1 | 2/2004 | Bannister |

FOREIGN PATENT DOCUMENTS

| | | |
|---|---|---|
| JP | 5280168 | 10/1993 |

OTHER PUBLICATIONS

First Solar EZ Mount PV, Marketing Material, 3 pages, Internet page downloaded May 20, 2003.

ASE-300-DG/50 Photovoltaic Module, Marketing Material, 3 pages, 1995.

PowerLight Roof-Jack System, 1 sheet of drawings, 1996.

* cited by examiner

US 7,155,870 B2

SHINGLE ASSEMBLY WITH SUPPORT BRACKET

STATE SPONSORED RESEARCH OR DEVELOPMENT

This invention was made with State of California support under California Energy Commission contract number 500-00-034. The Energy Commission has certain rights to this invention.

CROSS-REFERENCE TO OTHER APPLICATIONS

None.

BACKGROUND OF THE INVENTION

The widespread use of photovoltaic (PV) systems mounted to homes, businesses and factories is generally considered to be a desirable goal. Several factors are believed to be critical to the acceptance of PV systems, in particular by the individual homeowner. Primary among the factors are ease of installation, cost and aesthetics. One way of addressing both cost and aesthetics has been through the use of photovoltaic shingle assemblies. One way such shingle assemblies address the cost issue is by being used as a replacement for conventional shingles, preferably using similar mounting techniques. The aesthetic issue has begun to be addressed by the use of photovoltaic assemblies in the form of shingles or roofing tiles having similar configurations and dimensions as conventional shingles or roofing tiles, and by the use of appropriate colors and reflecting characteristics to help provide an aesthetically pleasing visual appearance to the roof or other building surface. See, for example, U.S. Pat. No. 5,112,408. However, photovoltaic shingle systems have not been as widely accepted as hoped-for because 1) PV mounted integrally with the building roof as shingles operate at higher temperatures, causing a reduction in PV electrical output due to an inverse relationship between temperature and PV efficiency; 2) the same higher operating temperatures approach or exceed the upper limit of the warranted PV operating temperature (typically 80 degrees C.) and serve to shorten the useful life of the PV shingle; 3) some products call for electrical connections between shingles to be made under the roof deck, requiring holes to be drilled through the roof deck which increases the likelihood of water leaks; 4) there has been poor aesthetic match of PV shingles in conjunction with the non-PV areas of the roof; 5) some PV shingles have been limited to amorphous silicon PV technology, which suffer from a low operating efficiency; and 6) the value of the PV shingle has typically been limited to the electrical output of the PV plus the material value of displaced conventional shingles when the product displaces conventional shingles.

See U.S. Pat. Nos. 3,769,091; 4,001,995; 4,040,867; 4,189,881; 4,321,416; 5,232,518; 5,575,861; 5,590,495; 5,968,287; 5,990,414; 6,061,978; 6,111,189; 6,584,737; and 6,606,830. See U.S. Patent Application Publication Nos. US 2001/0050101; US 2003/0154680; US 2003/0213201; US 2003/0217768; and US 2004/0031219. See also EP1035591A1; and WO96/24013.

BRIEF SUMMARY OF THE INVENTION

The present invention is directed to a shingle assembly especially useful as a photovoltaic shingle assembly which can be economically mounted directly to a support surface, such as a sloped roof, in a simple manner to create an aesthetically pleasing structure that integrates well with conventional roofing tiles.

A first aspect of the invention is directed to a shingle system for mounting to a support surface. The shingle system includes first, upper and second, lower shingle assemblies. Each of the first and second shingle assemblies comprises a support bracket and a shingle body secured to the support bracket. The support bracket comprises upper and lower ends. The upper end has an upper support portion extending away from the lower surface, an upper support-surface-engaging part engageable with a support surface so that the upper edge of the shingle body is positionable at a first distance from the support surface to create a first gap therebetween. The lower end has a lower support portion extending away from the lower surface. A portion of the shingle body along the lower edge of the first shingle assembly overlies a portion of the shingle body along the upper edge of the second shingle assembly so that the first and second shingle assemblies overlap one another. The lower support portion of the support bracket of the first shingle assembly is engageable with the second shingle assembly so to position the lower edge of the shingle body of the first shingle assembly spaced apart from the upper surface of the shingle body of the second shingle assembly to create: (1) a second gap between the lower surface of the shingle body of the first shingle assembly and the upper surface of the shingle body of the second shingle assembly, and (2) an open region beneath the first shingle assembly fluidly coupling the first and second gaps.

A second aspect of the invention is directed to a building surface assembly comprising a building surface and first, upper and second, lower shingle assemblies mounted to the building surface. Each of the first and second shingle assemblies comprises a support bracket and a shingle body secured to the support bracket. The support bracket comprises upper and lower ends. The upper end has an upper support portion extending away from the lower surface, an upper support-surface-engaging part engageable with the building surface so that the upper edge of the shingle body is positionable at a first distance from the building surface to create a first gap therebetween. The lower end has a lower support portion extending away from the lower surface. A portion of the shingle body along the lower edge of the first shingle assembly overlies a portion of the shingle body along the upper edge of the second shingle assembly so that the first and second shingle assemblies overlap one another. A portion of the shingle body along the lower edge of the third shingle assembly overlies a portion of the shingle body along the upper edge of the fourth shingle assembly so that the third and fourth shingle assemblies overlap one another. The lower support portion of the support bracket of the first shingle assembly is engageable with the second shingle assembly so to position the lower edge of the shingle body of the first shingle assembly spaced apart from the upper surface of the shingle body of the second shingle assembly to create: (1) a second gap between the lower surface of the shingle body of the first shingle assembly and the upper surface of the shingle body of the second shingle assembly, and (2) an open region beneath the first shingle assembly fluidly coupling the first and second gaps.

A third aspect of the invention is directed to a building surface assembly comprising a building surface and first and third upper photovoltaic (PV) shingle assemblies and second and fourth lower photovoltaic (PV) shingle assemblies mounted to the building surface. The building surface comprises a waterproof and radiant barrier. Each of the shingle assemblies comprises first and second support brackets and a shingle body secured to the support brackets. Each support bracket comprises upper and lower ends. The upper end has an upper support portion extending away from the lower surface, an upper support-surface-engaging part engageable with the building surface so that the upper edge of the shingle body is positionable at a first distance from the building surface to create a first gap therebetween. The lower end has a lower support portion extending away from the lower surface. The second side edges of the shingle bodies of the third and fourth shingle assemblies are positioned opposite the first side edges of the shingle bodies of the first and second shingle assemblies, respectively. A portion of the shingle body along the lower edge of the first shingle assembly overlies a portion of the shingle body along the upper edge of the second shingle assembly so that the first and second shingle assemblies overlap one another. A portion of the shingle body along the lower edge of the third shingle assembly overlies a portion of the shingle body along the upper edge of the fourth shingle assembly so that the third and fourth shingle assemblies overlap one another. The lower support portion of the support bracket of the first shingle assembly is engageable with the second shingle assembly so to position the lower edge of the shingle body of the first shingle assembly spaced apart from the upper surface of the shingle body of the second shingle assembly to create: (1) a second gap between the lower surface of the shingle body of the first shingle assembly and the upper surface of the shingle body of the second shingle assembly, and (2) an open region beneath the first shingle assembly fluidly coupling the first and second gaps. The lower support portion of the support bracket of the third shingle assembly is engageable with the fourth shingle assembly so to position the lower edge of the shingle body of the third shingle assembly spaced apart from the upper surface of the shingle body of the fourth shingle assembly to create: (1) a third gap between the lower surface of the shingle body of the third shingle assembly and the upper surface of the shingle body of the fourth shingle assembly, and (2) a second open region beneath the third shingle assembly fluidly coupling the first and third gaps. An air-permeable infiltration barrier is positioned within the second and third gaps.

Various features and advantages of the invention will appear from the following description in which the preferred embodiments have been set forth in detail in conjunction with the accompanying drawings.

BRIEF DESCRIPTION OF THE DRAWINGS

FIG. 9 is a simplified cross sectional view taken along line 9—9 of FIG. 6 illustrating the pan flashing element of FIGS. 5–8 with the side edges of laterally adjacent shingle bodies positioned adjacent to the upper end of the separator of the pan flashing element;

DETAILED DESCRIPTION OF THE INVENTION

Figure 1:
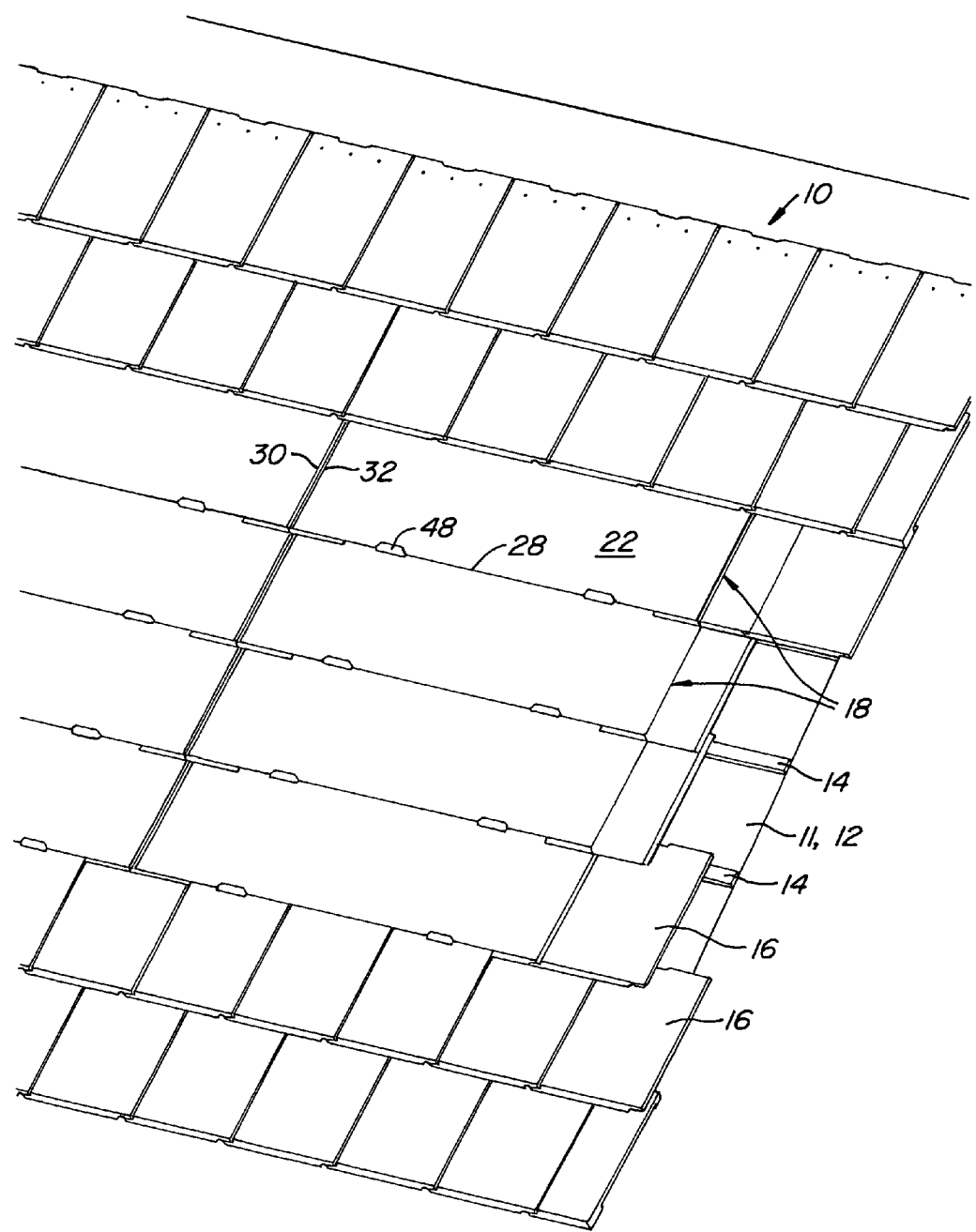
FIG. 1 is an overall view of a roofing system including an array of shingle assemblies made according to the invention.

FIG. 1 illustrates a roofing system 10 including a roofing support surface 11, support surface 11 comprising a waterproof and radiant barrier layer 12. Layer 12 may be a conventional underlayment, such as a metal foil faced tar sheet sold by MFM Building Products Corp. of Coshocton, Ohio as Peel & Seal. A series of laterally extending battens 14 are mounted to support surface 11 over layer 12. Support surface 12 is covered by conventional concrete tiles 16, such as MonierLifetile sold by MonierLifetile LLC of Irvine, Calif., and an array of photovoltaic (PV) shingle assemblies 18. As used in this application, a shingle covers products used to cover a wall or an inclined roof, or other non-horizontal surfaces, in which the lower end of one shingle overlaps the upper end of an adjacent shingle.

Figure 2:
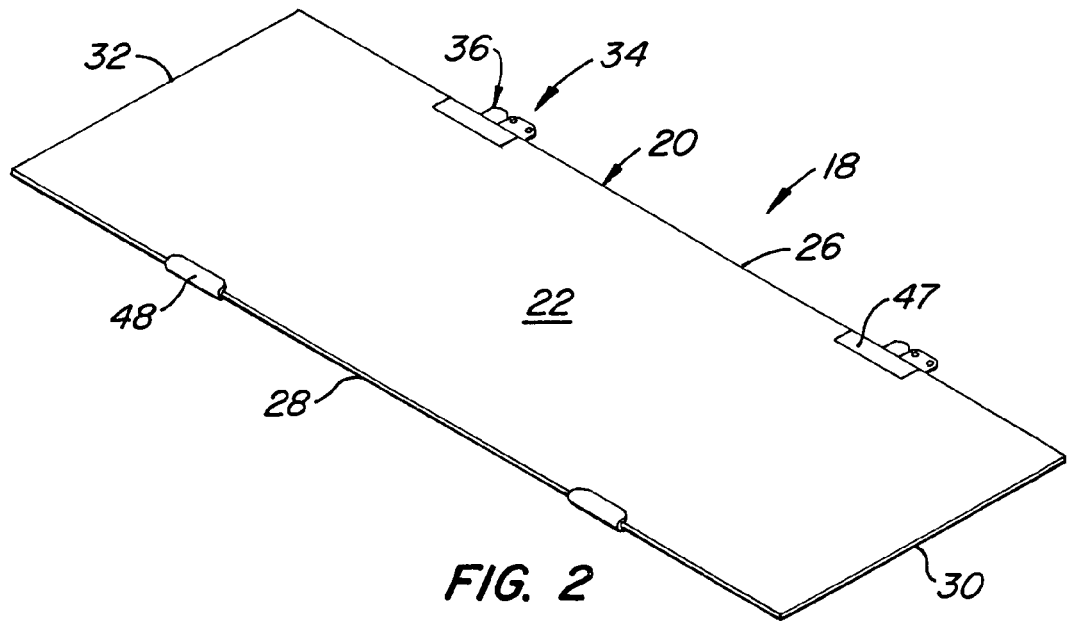
FIGS. 2 and 3 are top and bottom isometric views of a shingle assembly of FIG. 1.
Figure 3:
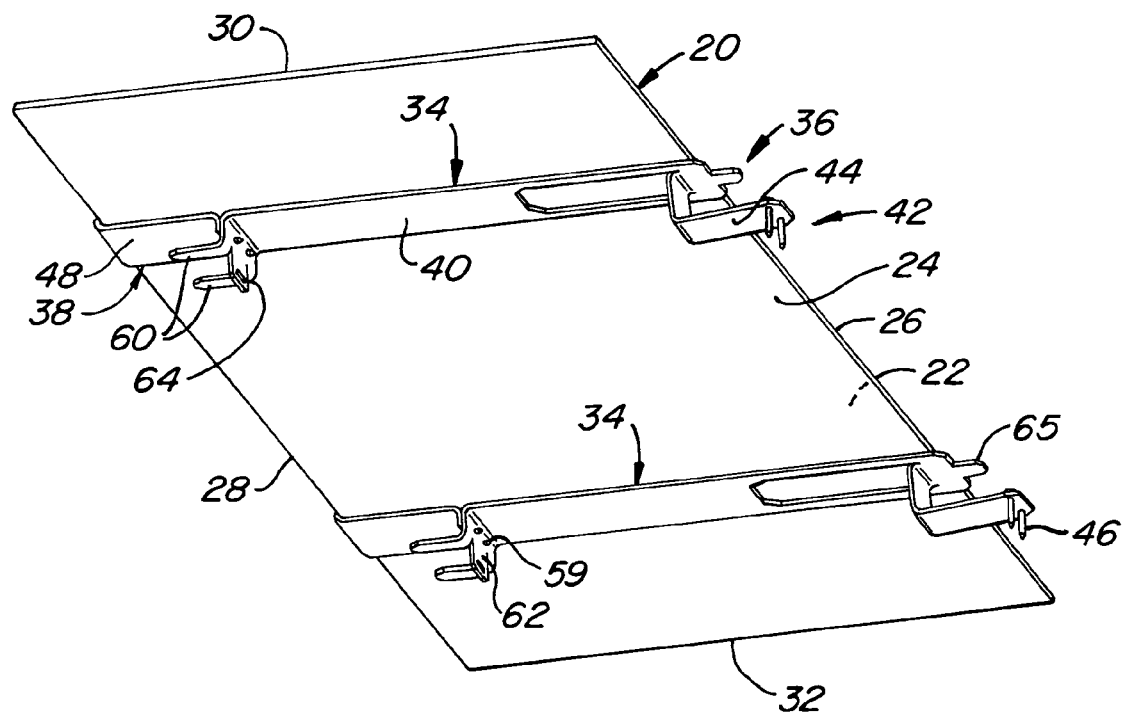

FIGS. 2 and 3 are enlarged top and bottom isometric views of a shingle assembly shown in FIG. 1. Each shingle assembly 18 comprises a shingle body 20 having upper and lower surfaces 22, 24, an upper edge 26, a lower edge 28, a first side edge 30 and a second side edge 32. Each shingle assembly 18 also includes a pair of support brackets 34 extending between upper and lower edges 26, 28. Support bracket 34 includes upper and lower ends 36, 38 connected by a middle portion 40. Upper end 36 comprises an upper support portion 42 extending downwardly away from lower surface 24. Portion 42 includes an upper support-surface-engaging part 44 used to secure support bracket 34, and shingle body 20 therewith, to support surface 11 using roofing nails, decking screws or other appropriate fasteners 46. Other fastening systems, such as the use of adhesives, may be used instead of or in addition to fasteners. Upper surface 22 of shingle body 20 has cushioning members 47 along upper edge 26 aligned with upper end 36. Lower end 38 comprises a clip 48 which engages lower edge 38 of shingle body 20. When appropriate, such as when clip 48 is made of steel, a protective material, such as a rubber pad, or soft polymer material such as butyl tape, may be placed between clip 48 and shingle body 20. The remainder of bracket 34 may be made of, for example, galvanized steel, a weatherable polymer or a polymer with a weatherable coating.

FIGS. 5–8 illustrate a first, upper shingle assembly 50 and a second, lower shingle assembly 52 mounted to support surface 11 with the lower end 54 of upper shingle assembly 50 overlying upper end 56 of lower shingle assembly 52. Lower end 38 of support bracket 34 includes a lower support portion 58 extending downwardly away from lower surface 24. Clip 48 is secured to portion 58 by a pair of self-tapping screws 59, or other suitable means. Portion 58 comprises a pair of support members 60 which rest on cushioning members 47 along the upper edge 26 of shingle assembly 52. Portion 50 also includes a downwardly extending tab 62 having an opening 64 formed therein. Opening 64 is sized and positioned for receipt of an engagement element 65 extending from upper end 36 of support bracket 34.

Upper end 36 of support bracket 34 positions upper edge 26 of shingle body 20 of lower shingle assembly 52 a first distance 66 above support surface 11 to create a first gap 68 therebetween. Lower edge 28 of shingle body 20 of upper shingle assembly 50 is spaced apart from upper surface 22 of shingle body 20 of lower shingle assembly 52 to create a second gap 70 therebetween. An open region 72 is created beneath upper shingle assembly 50 and fluidly couples first and second gaps 68, 70.

Figure 5:
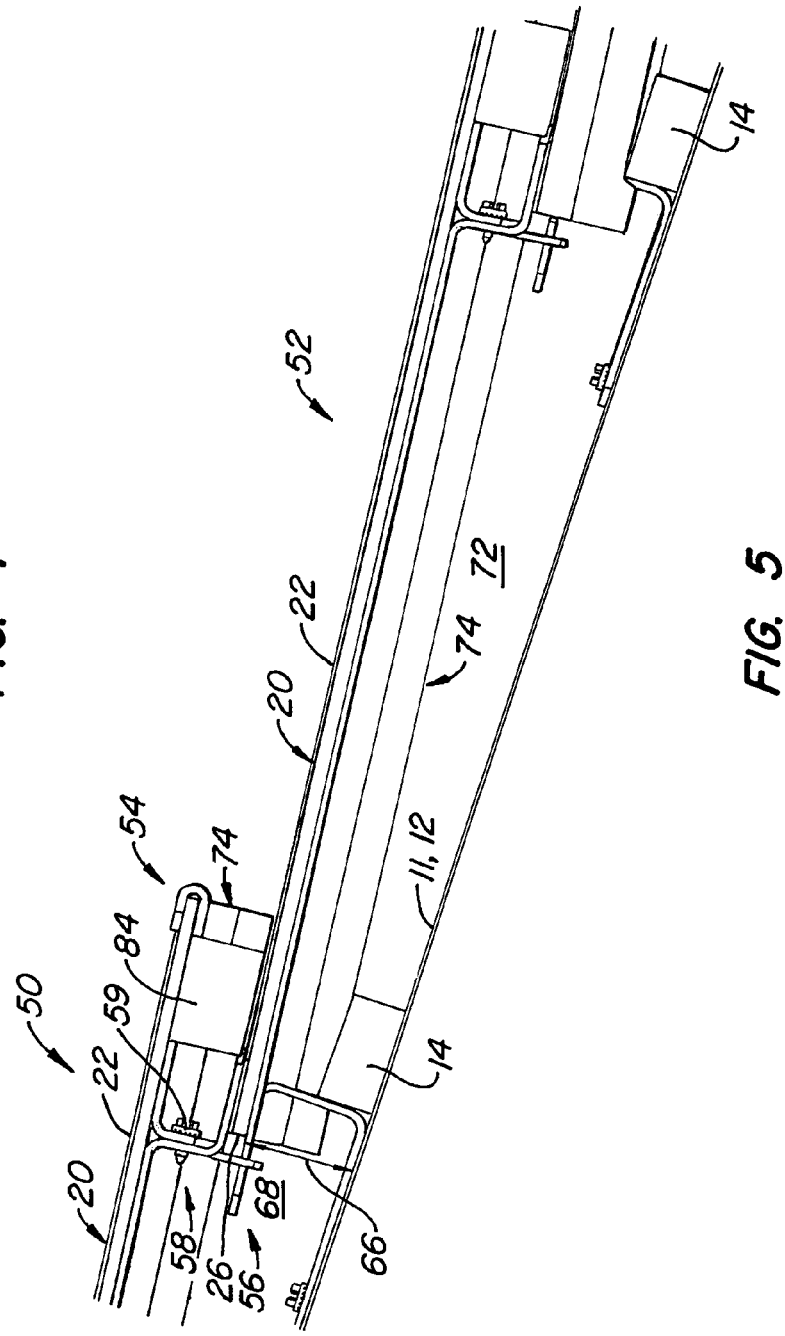
FIG. 5 is a side view of one of the rows of shingle assemblies of the roofing system of FIG. 1.
Figure 6:
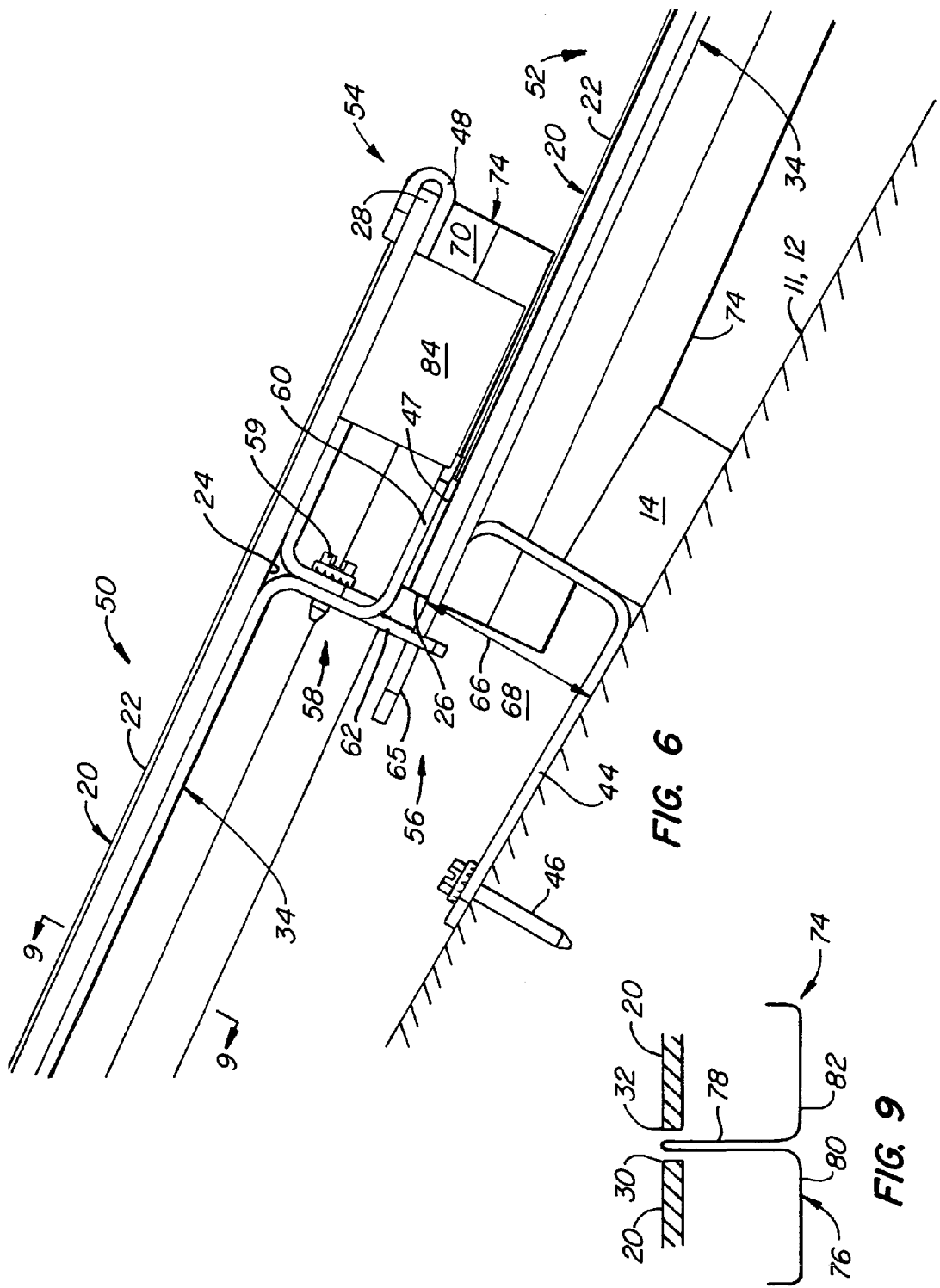
FIG. 6 is an enlarged view of a portion of the structure of FIG. 5.
Figure 7:
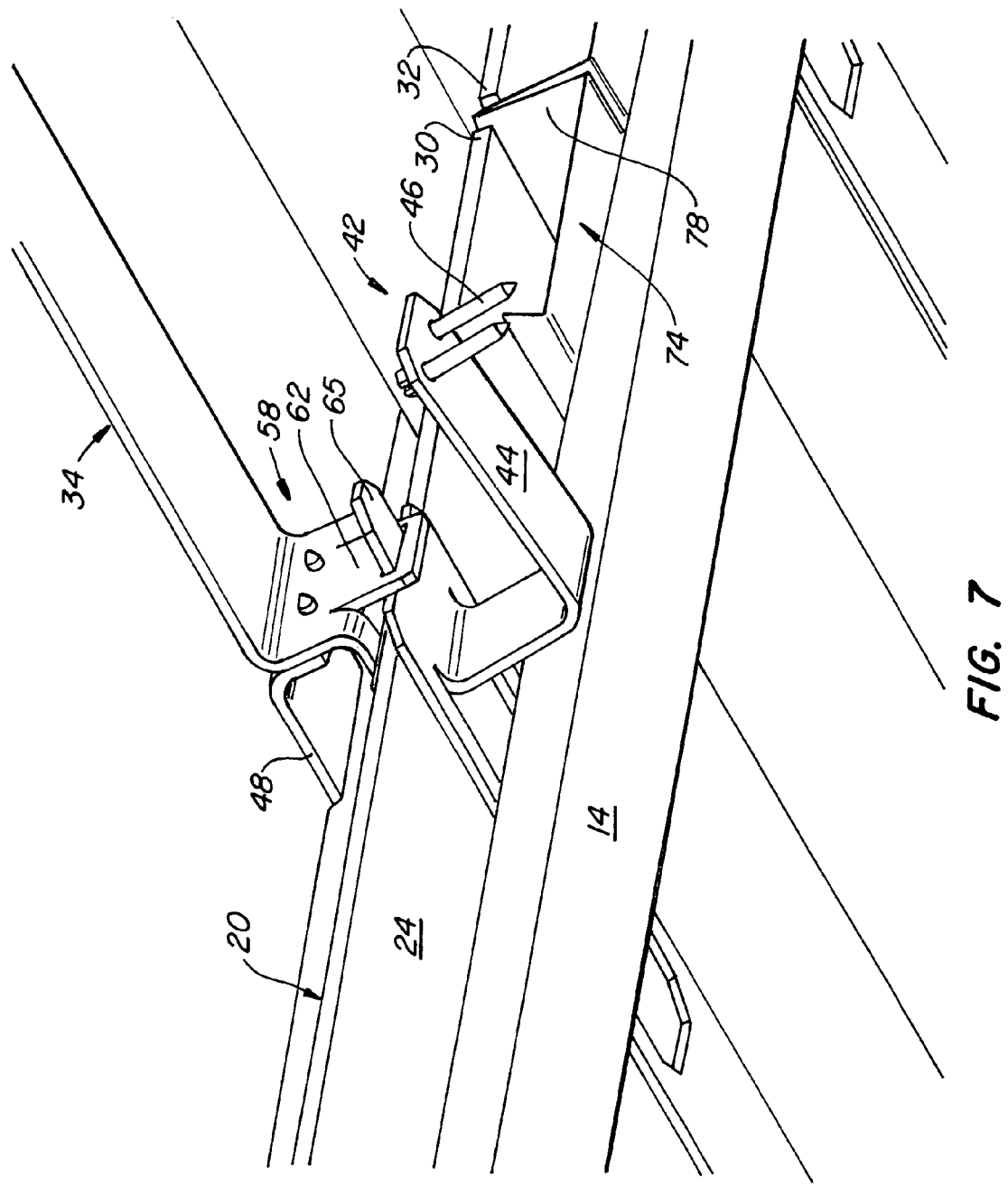
FIG. 7 is an underside view illustrating the interlocking of the upper and lower ends of the support brackets of upper and lower shingle assemblies with portions broken away for clarity.
Figure 8:
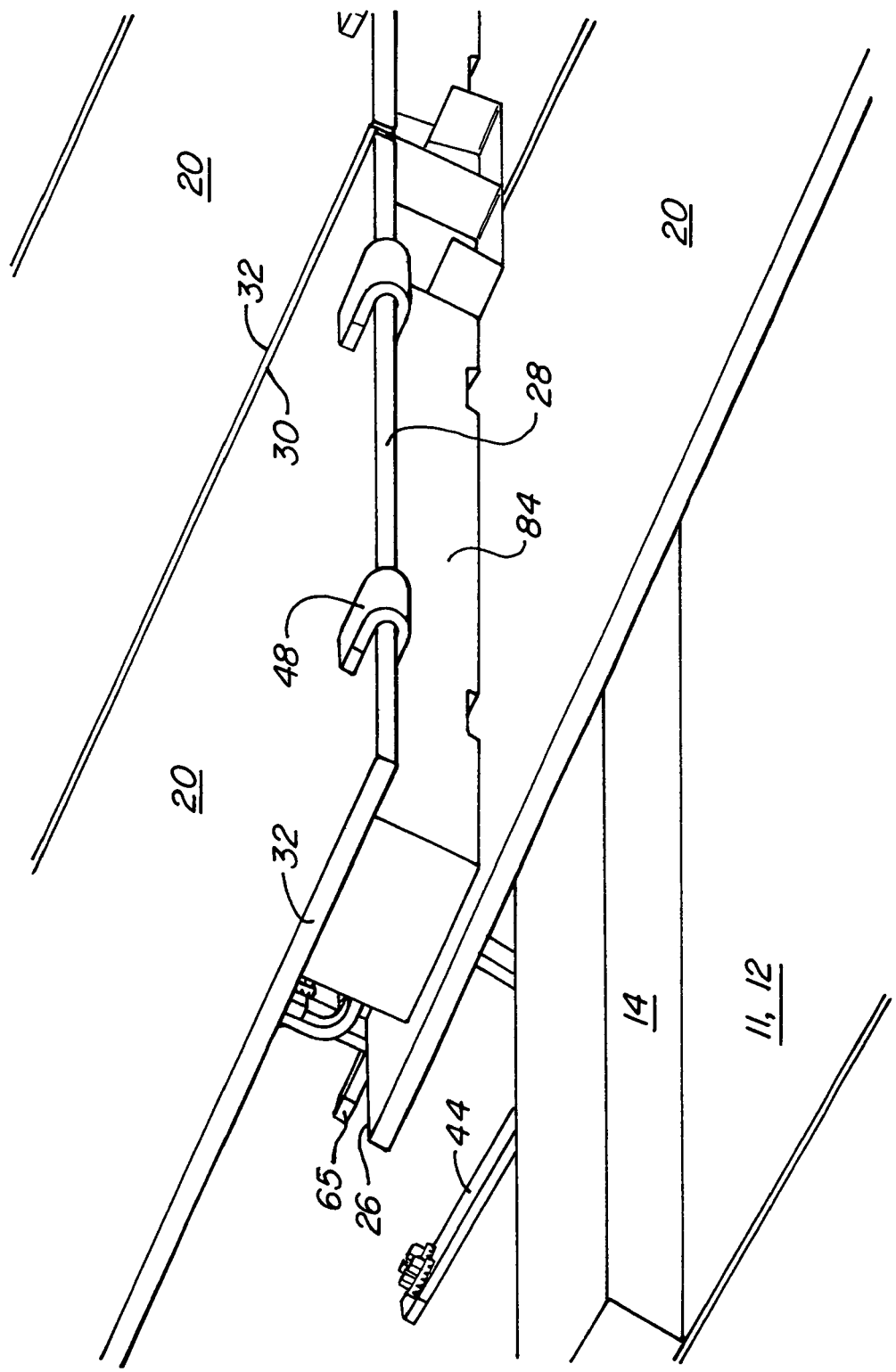
FIG. 8 is an overhead view illustrating the overlapping ends of upper and lower shingle assemblies.

A pan flashing element 74, see FIGS. 7–9, is used to collect rainwater that may pass between the side edges 30, 32 of laterally adjacent shingle assemblies 18. Element 74 includes a base 76 and a separator 78 extending upwardly from the base to a position between first and second side edges 30, 32. Base 76 defines first and second water-directing portions 80, 82 on either side of separator 78. The pan flashing element is secured in place by the weight of the tile above it and forces generated by fasteners holding the tile above it into place. The use of separator 78 helps to ensure that wind-blown material, in particular rain, is collected within water-directing portions 80, 82 of base 76. An air-permeable infiltration barrier 84, see FIGS. 5, 6 and 8, is positioned within second gap 70 to permit the movement of air into open region 72, thus helping to cool the underside of shingle body 20 and to prevent excessive moisture buildup, but prevents infiltration of wind-blown rain and insects, the building of bird nests, and other undesirable occurrences. A suitable infiltration barrier 84 is a perforated plastic block of material sold by Cor-A-Vent Inc. of Mishawaka, Ind. as Cor-A-Vent.

Some type of adhesive may be used between support brackets 34 and lower surface 24 of shingle body 20 to hold the brackets in place during shipping and installation. A presently preferred adhesive is a butyl tape, which remains generally soft and sticky. Pan flashing element 74 may be made of any appropriate material, such as 12 gauge galvanized steel.

Figure 10:
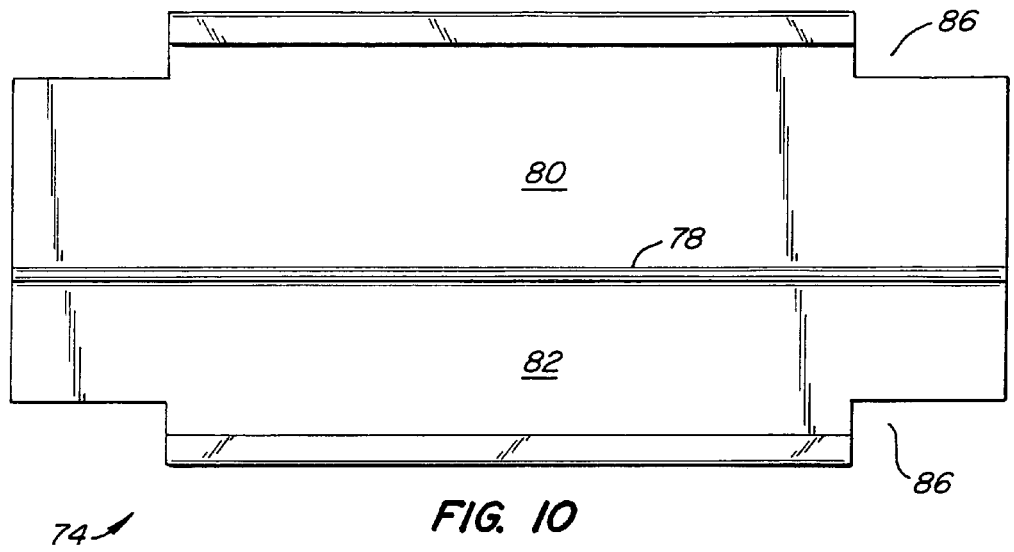
FIGS. 10, 11 and 12 are top, side and top perspective views of an alternative embodiment of the pan flashing element of FIGS. 5–9.
Figure 11:
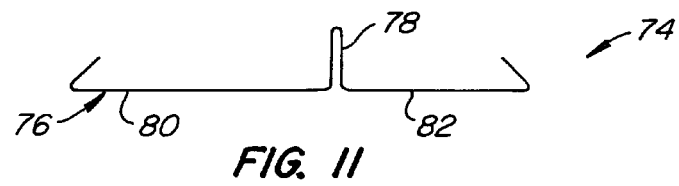
Figure 12:
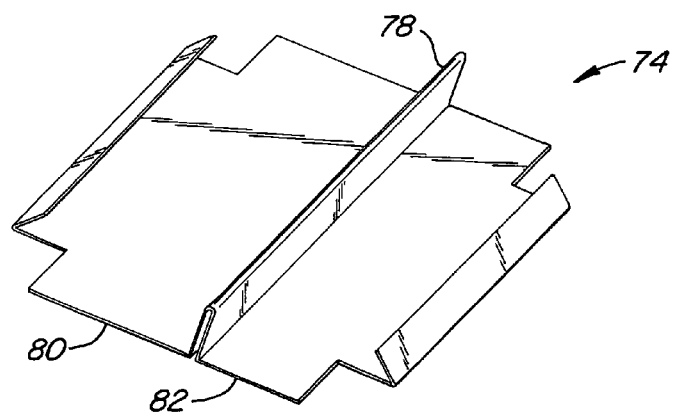

FIGS. 10–12 illustrate an alternative embodiments of the flash pan element 74 of FIGS. 5–9 specially designed for use with MonierLifetile brand of tiles 16 with like elements having like reference numerals. As can be seen from the figures, there are cutouts 86 at the corners of this embodiment of flash pan element 74.

Figure 4:
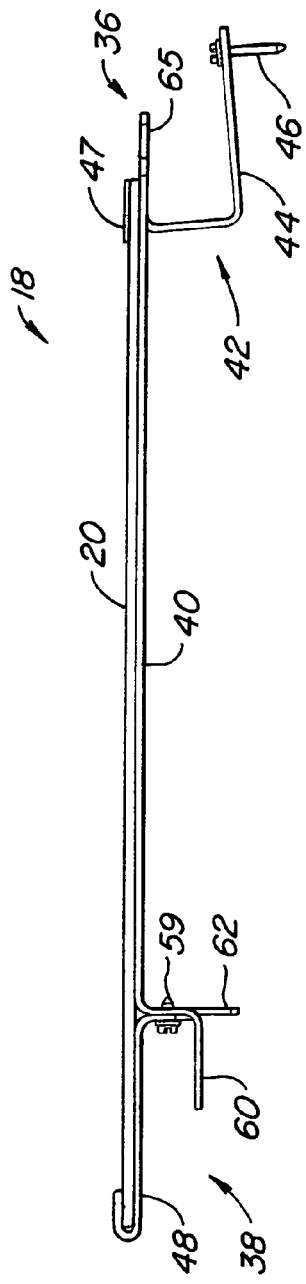
FIG. 4 is a right side view of the shingle assembly of FIG. 2.
Figure 13:
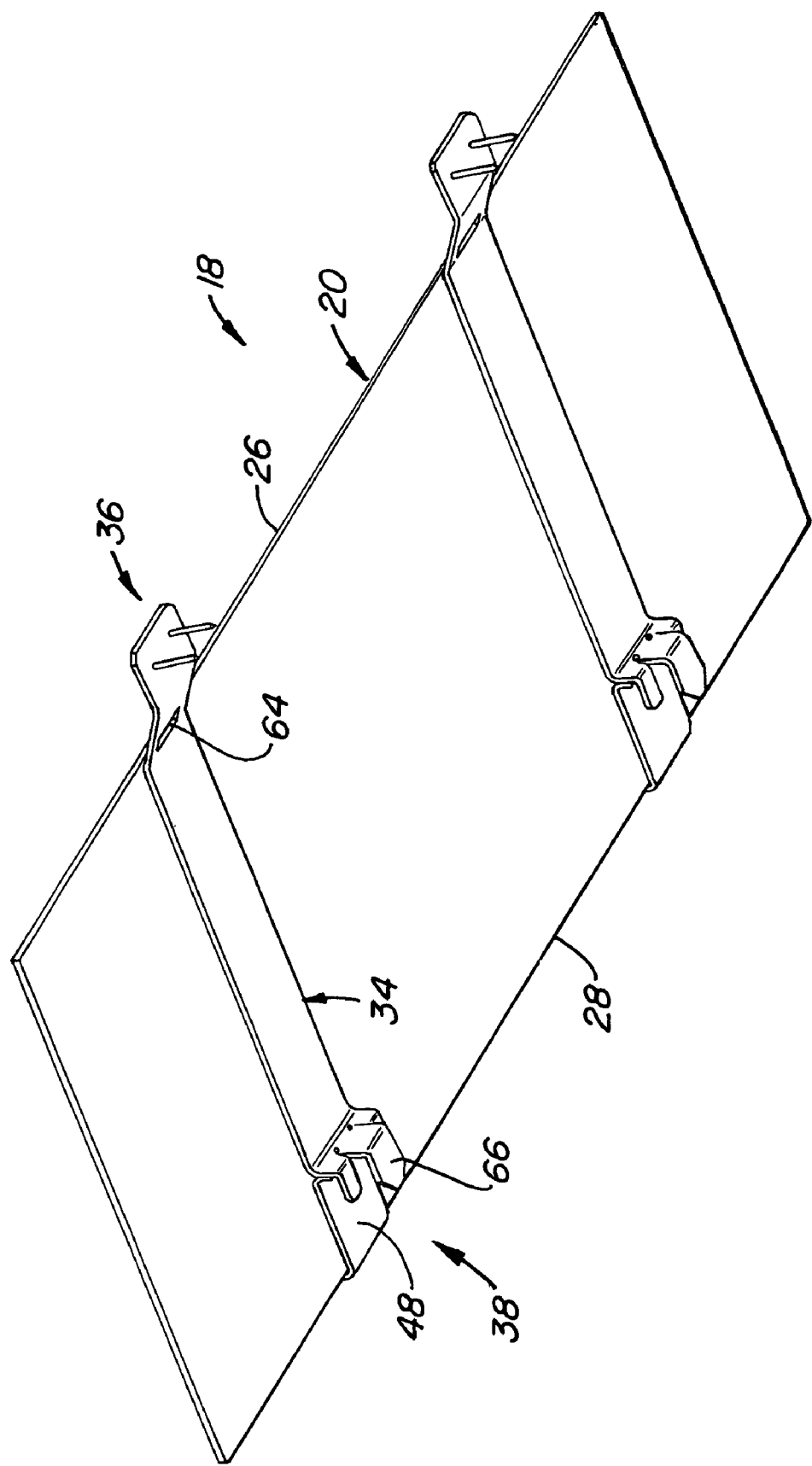
FIGS. 13 and 14 are views of an alternative embodiment of the shingle assembly of FIGS. 1–9 similar to the views of FIGS. 3 and 5.
Figure 14:
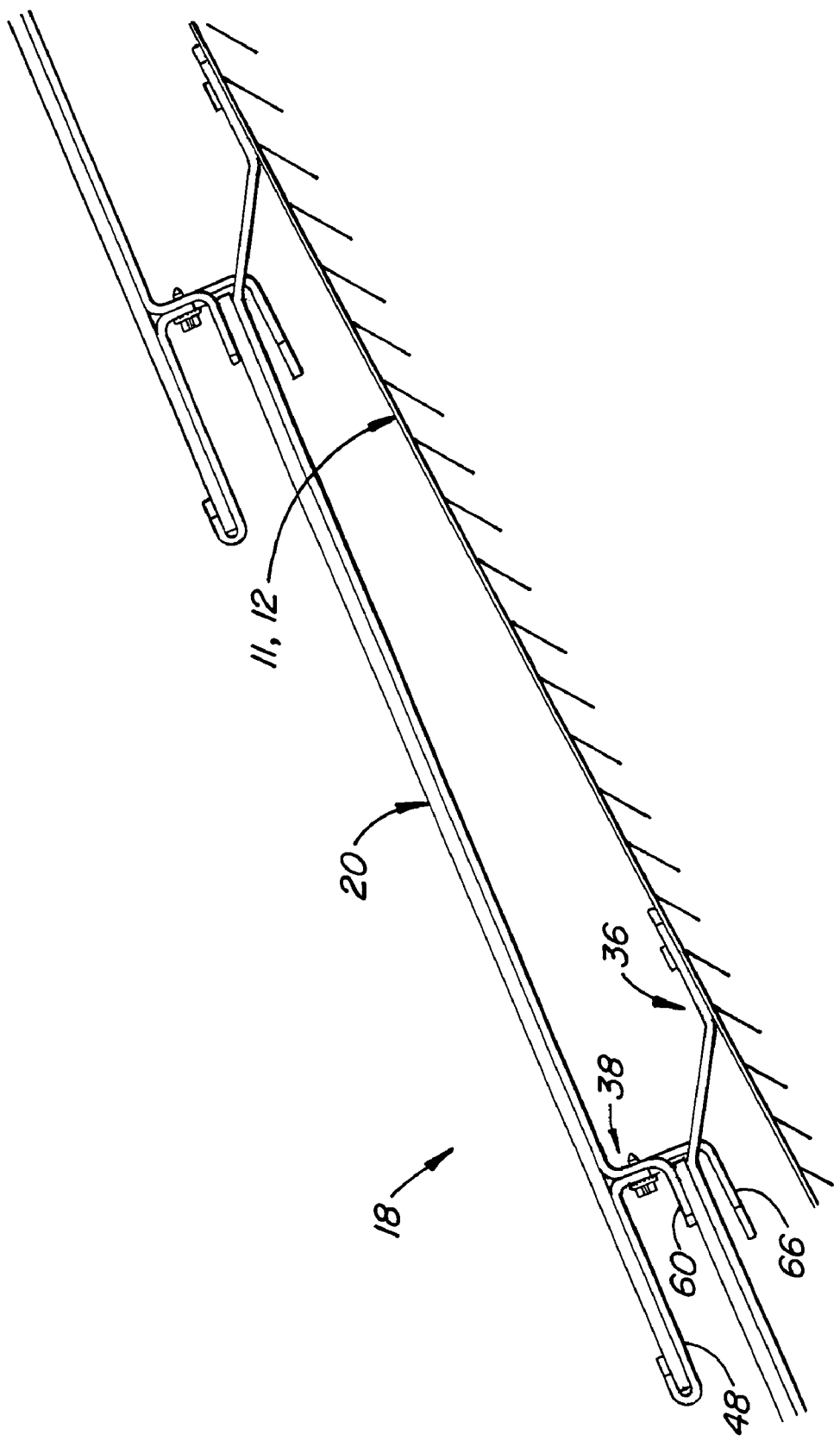

FIGS. 13 and 14 illustrate an alternative embodiment of the shingle assembly of FIGS. 2–4 with like reference numerals referring to like elements. The primary difference is that opening 64 is formed in upper end 36 of support bracket 34 (as opposed to lower end 38 in the prior embodiment) and engagement element 66 is a part of lower end 38 of support bracket 34.

Installation, when using concrete tiles 16, may proceed as with conventional concrete tile roof installation, with tiles 16 laid right to left in courses (rows) from the bottom towards the top of the roof (all directions facing the roof). Tiles 16 typically have a lip (not shown) that hooks onto batten 14. Concrete tiles 16 are generally staggered so that each row is offset from the one below it by one-half of a tile width. Where PV shingle assemblies 18 are to be installed, the tile 16 to the right of the bottom right tile may be cut off with a concrete saw. If the edge of a shingle assembly 18 falls in the middle of the tile below, the underhanging tongue of the adjacent full tile may be cut off. If not, a tile may be cut in half so that the cut edge roughly aligns between the two tiles below. A double pan flashing 74 is then placed beneath the adjacent concrete tile with separator 78 as close as practical to the side edge of the tile. The total width of the PV shingle assembly array is then measured off, including the gaps between PV shingle assemblies 18 with room for separator 78 of double pan flashing 74. Each PV shingle assembly 18 is preferably designed to span a whole number of concrete tiles, such as four. At the left side of the array of shingle assembly 16, either a half tile or whole tile (overhanging tongue not cut) is installed with a double pan flashing 74 with the separator 78 as close as possible to the edge of tile 16. The distance between the two pan flashings 74 is then verified to be the correct distance. Once this is accomplished, a first, bottom row of brackets 34 is installed with fasteners 46 passing into the support surface 11 at the correct spacing. The first row of brackets 34 has support members 60 located against the top edge of the concrete tiles 16. The first row of PV shingle assemblies 18 is then interengaged with the first row of brackets 34. Double pan flashing 74 is placed between each PV shingle assembly 18 in the row. Once the first, bottom row of PV shingle assemblies 18 is completed the rest of the concrete tiles 16 are installed conventionally. Then the next row of concrete tiles 16 is started. When the PV shingle assembly area is reached, the installation proceeds as above except that support members 60 of each bracket 34 interengages with the underlying upper end 36 of the bracket 34 and cushioning member 47 adhered to shingle body 20 at upper edge 26. In the course of this installation process, PV shingle assemblies 18 are wired together into strings and grounding jumpers are installed between all metal parts (pan flashings 74 and brackets 34). All home runs are run beneath PV shingle assemblies 18 and pass through support surface 11 through a sealed exit box, requiring a single penetration.

Other modification and variation can be made to the disclosed embodiments without departing from the subject of the invention as defined in following claims. For example, fewer or greater than two support brackets 34 may be used. Each support bracket may not include a middle portion. Also, a single support bracket may have more than one upper end 36 and/or lower end 38. If Installation methods other than that described above may also be used.

Any and all patents, patent applications and printed publications referred to above are incorporated by reference.

The invention claimed is:

1. A shingle system for mounting to a support surface comprising:
   first, upper and second, lower shingle assemblies, each of the first and second shingle assemblies comprising:
      a support bracket;
      a shingle body comprising an upper surface, a lower surface, and upper and lower edges connected by first and second side edges, the shingle body secured to the support bracket;
      the support bracket comprising:
         upper and lower ends;
         the upper end having an upper support portion extending away from the lower surface, the upper support portion having an upper support-surface-engaging part engageable with a support surface so that the upper edge of the shingle body is positionable at a first distance from the support surface to create a first gap therebetween; and
         the lower end having a lower support portion extending away from the lower surface;
      a portion of the shingle body along the lower edge of the first shingle assembly overlying a portion of the shingle body along the upper edge of the second shingle assembly so that the first and second shingle assemblies overlap one another;

the lower support portion of the support bracket of the first shingle assembly engageable with the second shingle assembly so to position the lower edge of the shingle body of the first shingle assembly spaced apart from the upper surface of the shingle body of the second shingle assembly to create: (1) a second gap between the lower surface of the shingle body of the first shingle assembly and the upper surface of the shingle body of the second shingle assembly, and (2) an open region beneath the first shingle assembly fluidly coupling the first and second gaps;

a chosen one of (1) the lower end of the support bracket of the first shingle assembly and (2) the upper end of the support bracket of the second shingle assembly, comprising a tab extending downwardly away from the shingle body of the first shingle assembly to a position below the upper surface of the shingle body of the second shingle assembly, the tab having an opening formed therein; and the upper end of the support bracket of the other of the (1) the lower end of the support bracket of the first shingle assembly and (2) the upper end of the support bracket of the second shingle assembly, comprising an engagement element engaged within said opening to be completely encircled by said opening.

2. The shingle system according to claim 1 wherein at least one of the shingle assemblies comprises a photovoltaic (PV) shingle assembly.

3. The shingle system according to claim 1 wherein the support bracket comprises a middle portion connecting the upper and lower ends.

4. The shingle system according to claim 1 wherein the lower end of the support bracket engages the lower edge of the shingle body.

5. The shingle system according to claim 1 wherein the lower end of the support bracket comprises a clip engaging the lower edge of the shingle body.

6. The shingle system according to claim 1 wherein each of the first and second shingle assemblies comprises first and second of said support brackets, said first and second support brackets being laterally spaced apart.

7. The shingle system according to claim 1 wherein the support bracket is spaced apart from the first and second side edges.

8. The shingle system according to claim 1 further comprising an air-permeable rain infiltration barrier positioned within the second gap.

9. The assembly according to claim 1 wherein the opening in the tab extends parallel to the lower edge of the shingle body and the engagement element extends perpendicular to the lower edge of the shingle body.

10. The assembly according to claim 1 wherein the upper support-surface-engaging part of the first shingle assembly comprises a support surface-engaging fastener, the support surface-engaging fastener being free from overlying structure of the first shingle assembly.

11. A building surface assembly comprising:

a building surface;

first, upper and second, lower shingle assemblies mounted to the building surface, each of the first and second shingle assemblies comprising:

a support bracket;

a shingle body comprising an upper surface, a lower surface, and upper and lower edges connected by first and second side edges, the shingle body secured to the first and second support brackets;

the support bracket comprising:

upper and lower ends;

the upper end having an upper support portion extending away from the lower surface, the upper support portion having an upper support-surface-engaging part secured to the building surface using a fastener extending into the building surface so that the upper edge of the shingle body is positioned at a first distance from the building surface to create a first gap therebetween;

the fastener of the upper support-surface-engaging part of the first shingle assembly being free from overlying structure of the first shingle assembly; and the lower end having a lower support portion extending away from the lower surface;

a portion of the shingle body along the lower edge of the first shingle assembly overlying a portion of the shingle body along the upper edge of the second shingle assembly so that the first and second shingle assemblies overlap one another;

the lower support portion of the support bracket of the first shingle assembly engageable with the second shingle assembly so to position the lower edge of the shingle body of the first shingle assembly spaced apart from the upper surface of the shingle body of the second shingle assembly to create: (1) a second gap between the lower surface of the shingle body of the first shingle assembly and the upper surface of the shingle body of the second shingle assembly, and (2) an open region beneath the first shingle assembly fluidly coupling the first and second gaps;

a chosen one of (1) the lower end of the support bracket of the first shingle assembly and (2) the upper end of the support bracket of the second shingle assembly, comprising a tab extending downwardly away from the shingle body of the first shingle assembly to a position below the upper surface of the shingle body of the second shingle assembly, the tab having an opening formed therein; and the upper end of the support bracket of the other of the (1) the lower end of the support bracket of the first shingle assembly and (2) the upper end of the support bracket of the second shingle assembly, comprising an engagement element engaged within said opening to be completely encircled by said opening.

12. The assembly according to claim 11 wherein at least one of the shingle assemblies comprises a photovoltaic (PY) shingle assembly.

13. The shingle assembly according to claim 11 wherein each of the first and second shingle assemblies comprises first and second of said support brackets, said first and second support brackets being laterally spaced apart.

14. The assembly according to claim 11 further comprising an air-permeable infiltration barrier positioned within the second gap.

15. The assembly according to claim 11 further comprising third, upper and fourth, lower of said shingle assemblies mounted to the building surface, the second side edges of the shingle bodies of the third and fourth shingle assemblies positioned opposite the first side edges of the shingle bodies of the first and second shingle assemblies, respectively.

16. The assembly according to claim 11 wherein the building surface comprises a waterproof barrier.

17. The assembly according to claim 11 wherein the building surface comprises a waterproof and radiant barrier.

18. The assembly according to claim 11 wherein the building surface comprises a laterally extending batten.

19. The assembly according to claim 18 wherein the upper end of the support bracket contacts the batten.

20. The assembly according to claim 11 further comprising a plurality of shingle tiles mounted to the building surface, at least some of the shingle tiles being adjacent to the shingle assemblies.

21. The assembly according to claim 20 wherein said shingle tiles comprise concrete shingle tiles.

* * * * *